United States Patent
Zou et al.

(10) Patent No.: US 11,891,409 B2
(45) Date of Patent: Feb. 6, 2024

(54) TRIFLUOROMETHYL ALKENYLPHOSPHONATE AND PREPARATION METHOD THEREFOR

(71) Applicant: SOOCHOW UNIVERSITY, Suzhou (CN)

(72) Inventors: Jianping Zou, Suzhou (CN); Chengkun Li, Suzhou (CN); Dongliang Zhang, Suzhou (CN); Zekun Tao, Suzhou (CN); Jianan Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 546 days.

(21) Appl. No.: 17/226,213

(22) Filed: Apr. 9, 2021

(65) Prior Publication Data

US 2021/0221831 A1  Jul. 22, 2021

Related U.S. Application Data

(63) Continuation of application No. PCT/CN2018/109541, filed on Oct. 9, 2018.

(51) Int. Cl.
*C07F 9/40* (2006.01)

(52) U.S. Cl.
CPC .................... *C07F 9/40* (2013.01)

(58) Field of Classification Search
CPC .................... C07F 9/40; C07F 9/4015
See application file for complete search history.

(56) References Cited

PUBLICATIONS

Arun Maji et al., "Direct Synthesis of !!Tri!uoromethyl Ketone from (Hetero)arylacetylene: Design, Intermediate Trapping, and Mechanistic Investigations" Organic Letters, vol. 16, No. 17, pp. 4524-4526 (Aug. 15, 2014).

*Primary Examiner* — Deborah D Carr
(74) *Attorney, Agent, or Firm* — SZDC Law PC

(57) ABSTRACT

Disclosed are a trifluoromethyl alkenylphosphonate derivative and preparation method therefor. The preparation method comprises the following steps: dissolving an acetylene derivative, an iodine compound, and a phosphorus reagent in a solvent for reaction at the temperature from the room temperature to 100° C. to obtain the trifluoromethyl alkenylphosphonate derivative. In the present invention, the acetylene derivative is used as a starting material, and the raw materials are easily available and diversified; products obtained by using the method of the present invention have various types and can be directly used and also used for other further reactions; moreover, the method disclosed in the present invention has the advantages of short steps, mild reaction conditions, simple reaction operation and post-treatment processes, and high yield, and is suitable for large-scale production.

6 Claims, No Drawings

TRIFLUOROMETHYL ALKENYLPHOSPHONATE AND PREPARATION METHOD THEREFOR

The present application is a Continuation Application of PCT/CN2018/1099541, filed on Oct. 9, 2018, which is incorporated by reference for purposes as if fully set forth herein.

TECHNICAL FIELD

The invention relates to the technical field of organic compounds, and particularly, relates to a trifluoromethyl alkenylphosphonate derivative and a preparation method therefor.

BACKGROUND TECHNIQUE

Organic phosphonates have strong biological activity and are widely used as insecticides, renin and protease inhibitors (Reference 1: Shidlovskii A F, Peregudov A S, Averkiev B B, et al, Three-component condensation of trifluoromethyl-substituted cyanovinylphosphonates, arylamines, and ketones and cytotoxic activity of products thus obtained, Russian Chemical Bulletin, 2010, 59, 144. Reference 2: Dellaria Jr J F, Maki R G, Stein H H, et al, New inhibitors of renin that contain novel phosphostatine Leu-Val replacements, Journal of medicinal chemistry, 1990, 33, 534. Reference 3 Wester R T, Chambers R J, Green M D, et al, Preparation of a novel series of phosphonate norstatine renin inhibitors, Bioorganic & Medicinal Chemistry Letters, 1994, 4, 2005. Reference 4 Arai T, Bougauchi M, Sasai H, et al, Catalytic asymmetric synthesis of α-hydroxy phosphonates using the Al—Li-BINOL complex, The Journal of Organic Chemistry, 1996, 61, 2926). After the introduction of trifluoromethyl into the organic phosphonate molecule, its activity will be further improved. Trifluoromethyl alkenyl phosphonate contains a variety of important functional groups and has various potential physiological activities. In addition, it can be used as an important starting material. It is used in various chemical synthesis, but the existing preparation methods have the problems of rare starting materials, many steps, harsh reaction conditions, and the need to use highly toxic agents, such as thionyl chloride and bromine.

Beneficial Effects

The object of the present invention is to provide a method for preparing a trifluoromethyl alkenyl phosphonate derivative, which has the advantages of short steps, mild reaction conditions, high yield and good universality, and can be synthesized in one step from the starting materials.

Technical Solutions

In order to achieve the above-mentioned object of the invention, the technical solution adopted by the present invention is:

A method for preparing a trifluoromethyl alkenylphosphonate derivative which includes the following steps:

Dissolving an acetylene derivative, an iodine compound and a phosphorus reagent in a solvent and reacting at room temperature to 100° C. to obtain the trifluoromethyl alkenylphosphonate derivative.

The acetylene derivative has the following structure:

$R^1$ is aryl, cyano or ester; $R^2$ is hydrogen, cyano or ester; The iodine compound has the following structure:

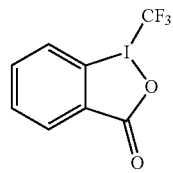 [SMILES: O=C1OI(C(F)(F)F)c2ccccc21]

The phosphorus reagent has the following general chemical structural formula:

$P(OR^4)_3$ 

$R^4$ is methyl, ethyl, isopropyl or butyl.

In the present invention, the solvent is selected from the group consisting of acetone, ethyl acetate, toluene, and N,N-dimethylformamide.

In the present invention, the acetylene derivative is selected from the group consisting of phenylacetylene, 4-methylphenylacetylene, 4-methoxyphenylacetylene, 4-fluorophenylacetylene, 4-chlorophenylacetylene, 4-bromophenylacetylene, 4-nitrophenylacetylene, 4-methoxycarbonyl-phenylacetylene, 4-cyano-phenylacetylene, 1-trifluoromethyl-2-cyanoacetylene, 2-ethynylthiophene, 2-bromophenylacetylene, and 3-fluorophenylacetylene; the phosphorus reagent is selected from the group consisting of trimethyl phosphite, triethyl phosphite, and tri-n-butyl phosphate.

In the present invention, the reaction is tracked to completion by a thin layer chromatography (TLC).

In the present invention, a molar ratio of the acetylene derivative:the iodine compound:the phosphorus reagent is 1:1.5:(3 to 7).

In the present invention, the product is subjected to column chromatography separation and purification after the reaction.

The present invention also discloses that an application of an acetylene derivative, an iodine compound and a phosphorus reagent as starting materials to prepare a trifluoromethyl alkenylphosphonate derivative. Preferably, the preparation is performed in a solvent.

In the embodiment, the acetylene derivative, the iodine compound and the phosphorus reagent are dissolved in the solvent and reacted at room temperature to 100° C. to obtain the trifluoromethyl alkenylphosphonate derivative.

The acetylene derivative has the following structure:

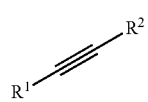

$R^1$ is aryl, cyano or ester; $R^2$ is hydrogen, cyano or ester.
The iodine compound has the following structure:

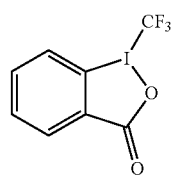 [SMILES: O=C1OI(C(F)(F)F)c2ccccc21]

The phosphorus reagent has the following general chemical structural formula:

R[4] is methyl, ethyl, isopropyl or butyl;

The solvent is selected from the group consisting of acetone, ethyl acetate, toluene, and N, N-dimethylformamide The reaction of the above technical solution can be expressed as:

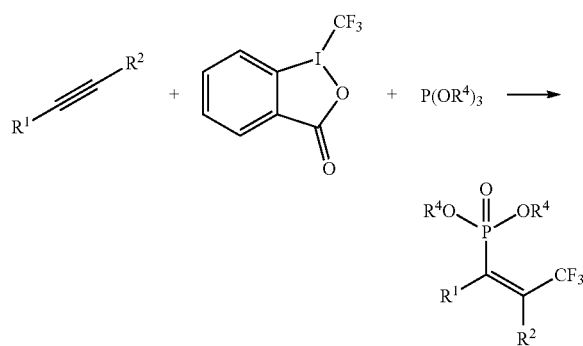

Beneficial Effects:

Due to the application of the above technical solutions, the present invention has the following advantages over the prior art:

1. The present invention uses acetylene derivative as starting material, and the starting materials are easily available and there are many types. The products obtained by the method of the present invention have various types, which can be used directly or used in other further reactions.
2. The reaction of the present invention has mild reaction conditions, few steps, simple reaction operation and post-treatment process, high yield, and is suitable for large-scale production, especially no catalyst is needed.

EMBODIMENTS OF THE INVENTION

The following further describes the present invention with reference to the embodiments:

In the embodiments, the iodine compound has the following structure:

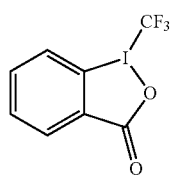

Example 1 Synthesis of (1-phenyl-2-trifluoromethyl)vinylphosphonic acid diethyl ester Taking phenylacetylene as starting material, the reaction steps were as follow:

(1) Phenylacetylene (20.4 mg, 0.2 mmol), the iodine compound (94.8 mg, 0.3 mmol), triethyl phosphite (99.4 mg, 0.6 mmol) were dissolved in 1 mL of acetone in a reaction flask. The reaction mixture was stirred at 60° C.;

(2) The reaction was tracked to completion by TLC.

(3) After the reaction was complete, the reaction mixture containing a crude product was purified by column chromatography (petroleum ether:acetone=1:8) to obtain the title compound (a yield of 93%). The analytical data of the product: $^1$H NMR (400 MHz, CDCl$_3$): δ 7.54-7.36 (m, 3H), 7.30 (dd, J=6.7, 2.8 Hz, 2H), 6.81 (dq, J=23.0, 7.7 Hz, 1H), 4.27-4.01 (m, 4H), 1.41-1.24 (m, 6H); HRMS (ESI-TOF) m/z: (M+Na): calculated value: 331.0687, measured value: 331.0691.

Example 2 Synthesis of (1-(4-tolyl)-2-trifluoromethyl)vinylphosphonic acid diethyl ester Taking 4-methylphenylacetylene as starting material, the reaction steps were as follow:

(1) 4-Methylphenylacetylene (23.2 mg, 0.2 mmol), the iodine compound (94.8 mg, 0.3 mmol), triethyl phosphite (132.8 mg, 0.8 mmol) were dissolved in 1 mL of acetone in a reaction flask. The reaction mixture was stirred at 50° C.;

(2) The reaction was tracked to completion by TLC.

(3) After the reaction was complete, the reaction mixture containing a crude product was purified by column chromatography (petroleum ether:acetone=1:8) to obtain the title compound (a yield of 87%). The analytical data of the product: $^1$H NMR (400 MHz, CDCl$_3$): δ 7.17 (q, J=8.2 Hz, 3H), 6.74 (dq, J=23.0, 7.7 Hz, 1H), 4.18-3.95 (m, 4H), 2.37 (s, 3H), 1.28 (t, J=7.1 Hz, 6H); HRMS (ESI-TOF) m/z: (M+Na): calculated value: 345.0843, measured value: 345.0857.

Example 3 Synthesis of (1-(4-methoxyphenyl)-2-trifluoromethyl)vinylphosphonic acid diethyl ester Taking 4-methoxyphenylacetylene as starting material, the reaction steps were as follow:

(1) 4-Methoxyphenylacetylene (26.4 mg, 0.2 mmol), the iodine compound (94.8 mg, 0.3 mmol), triethyl phosphite (166 mg, 1.0 mmol) were dissolved in 1 mL of ethyl acetate in a reaction flask. The reaction mixture was stirred at 40° C.;

(2) The reaction was tracked to completion by TLC.

(3) After the reaction was complete, the reaction mixture containing a crude product was purified by column chromatography (petroleum ether:acetone=1:8) to obtain the title compound (a yield of 83%). The analytical data of the product: $^1$H NMR (400 MHz, CDCl$_3$): δ 7.20 (dd, J=8.7, 1.9 Hz, 2H), 6.90 (t, J=5.5 Hz, 2H), 6.70 (dq, J=23.0, 7.8 Hz, 1H), 4.12-4.02 (m, 4H), 3.81 (s, 3H), 1.27 (t, J=7.1 Hz, 6H); HRMS (ESI-TOF) m/z: (M+H): calculated value: 339.0973, measured value: 339.0984.

Example 4 Synthesis of (1-(4-fluorophenyl)-2-trifluoromethyl)vinylphosphonic acid diethyl ester Taking 4-fluorophenylacetylene as starting material, the reaction steps were as follow:

(1) 4-Fluorophenylacetylene (24 mg, 0.2 mmol), the iodine compound (94.8 mg, 0.3 mmol), triethyl phosphite (199.2 mg, 1.2 mmol) were dissolved in 1 mL of ethyl acetate in a reaction flask. The reaction mixture was stirred at room temperature;

(2) The reaction was tracked to completion by TLC.

(3) After the reaction was complete, the reaction mixture containing a crude product was purified by column chromatography (petroleum ether:acetone=1:8) to obtain the title compound (a yield of 75%). The analytical data of the product: $^1$H NMR (400 MHz, CDCl$_3$): δ 7.32-7.20 (m, 2H), 7.07 (dd, J=15.4, 7.0 Hz, 2H), 6.75 (dq, J=22.8, 7.6 Hz, 1H), 4.23-3.99 (m, 4H), 1.28 (t, J=12.3, 6.0 Hz, 6H); HRMS (ESI-TOF) m/z: (M+Na): calculated value: 349.0593, measured value: 349.0600.

Example 5 Synthesis of (1-(4-chlorophenyl)-2-trifluoromethyl)vinylphosphonic acid diethyl ester Taking 4-chlorophenylacetylene as starting material, the reaction steps were as follow:
(1) 4-Chlorophenylacetylene (27.2 mg, 0.2 mmol), the iodine compound (94.8 mg, 0.3 mmol), triethyl phosphite (232 mg, 1.4 mmol) were dissolved in 1 mL of ethyl acetate in a reaction flask. The reaction mixture was stirred at 70° C.;
(2) The reaction was tracked to completion by TLC.
(3) After the reaction was complete, the reaction mixture containing a crude product was purified by column chromatography (petroleum ether:acetone=1:8) to obtain the title compound (a yield of 77%). The analytical data of the product: $^1$H NMR (400 MHz, CDCl$_3$): δ 7.37-7.33 (m, 2H), 7.24-7.15 (m, 2H), 6.75 (dq, J=22.9, 7.6 Hz, 1H), 4.13-4.04 (m, 4H), 1.31-1.25 (m, 6H). HRMS (ESI-TOF) m/z: (M+H); HRMS (ESI-TOF) m/z: (M+H): calculated value: 343.0478, measured value: 343.0485.

Example 6 Synthesis of (1-(4-bromophenyl)-2-trifluoromethyl)vinylphosphonic acid diethyl ester Taking 4-bromophenylacetylene as starting material, the reaction steps were as follow:
(1) 4-Bromophenylacetylene (36.2 mg, 0.2 mmol), the iodine compound (94.8 mg, 0.3 mmol), triethyl phosphite (99.4 mg, 0.6 mmol) were dissolved in 1 mL of toluene in a reaction flask. The reaction mixture was stirred at 100° C.;
(2) The reaction was tracked to completion by TLC.
(3) After the reaction was complete, the reaction mixture containing a crude product was purified by column chromatography (petroleum ether:acetone=1:8) to obtain the title compound (a yield of 81%). The analytical data of the product: $^1$H NMR (400 MHz, CDCl$_3$): δ 7.50 (d, J=8.2 Hz, 2H), 7.12 (dd, J=8.5, 1.9 Hz, 2H), 6.74 (dq, J=22.9, 7.6 Hz, 1H), 4.12-4.03 (m, 4H), 1.27 (t, J=7.1 Hz, 6H); HRMS (ESI-TOF) m/z: (M+Na): calculated value: 408.9792, measured value: 8.9810.

Example 7 Synthesis of (1-(4-cyanophenyl)-2-trifluoromethyl)vinylphosphonic acid diethyl ester Taking 4-cyanophenylacetylene as starting material, the reaction steps were as follow:
(1) 4-Cyanophenylacetylene (25.4 mg, 0.2 mmol), the iodine compound (94.8 mg, 0.3 mmol), triethyl phosphite (166 mg, 1.0 mmol) were dissolved in 1 mL of N, N-dimethylformamide in a reaction flask. The reaction mixture was stirred at room temperature;
(2) The reaction was tracked to completion by TLC.
(3) After the reaction was complete, the reaction mixture containing a crude product was purified by column chromatography (petroleum ether:acetone=1:8) to obtain the title compound (a yield of 88%). The analytical data of the product: $^1$H NMR (400 MHz, CDCl$_3$): δ 7.67 (t, J=7.2 Hz, 2H), 7.37 (dd, J=8.3, 1.7 Hz, 2H), 6.79 (dq, J=22.8, 7.5 Hz, 1H), 4.16-4.07 (m, 4H), 1.29 (t, J=7.1 Hz, 6H); HRMS (ESI-TOF) m/z: (M+Na): calculated value: 356.0639, measured value: 356.0645.

Example 8 Synthesis of (1-(4-nitrophenyl)-2-trifluoromethyl)vinylphosphonic acid diethyl ester Taking 4-nitrophenylacetylene as starting material, the reaction steps were as follow:
(1) 4-Nitrophenylacetylene (29.4 mg, 0.2 mmol), the iodine compound (94.8 mg, 0.3 mmol), triethyl phosphite (166 mg, 1.0 mmol) were dissolved in 1 mL of N, N-dimethylformamide in a reaction flask. The reaction mixture was stirred at 90° C.;
(2) The reaction was tracked to completion by TLC.
(3) After the reaction was complete, the reaction mixture containing a crude product was purified by column chromatography (petroleum ether:acetone=1:8) to obtain the title compound (a yield of 82%). The analytical data of the product: $^1$H NMR (400 MHz, CDCl$_3$): δ 8.28 (d, J=8.3 Hz, 2H), 7.46 (dd, J=8.7, 1.8 Hz, 2H), 6.85 (dq, J=22.7, 7.5 Hz, 1H), 4.21-4.07 (m, 4H), 1.31 (t, J=7.0 Hz, 6H); HRMS (ESI-TOF) m/z: (M+H): calculated value: 354.0718, measured value: 354.0731.

Example 9 Synthesis of (1-(4-methoxycarbonylphenyl)-2-trifluoromethyl)vinylphosphonic acid diethyl ester Taking 4-methoxycarbonylphenylacetylene as starting material, the reaction steps were as follow:
(1) 4-Methoxycarbonylphenylacetylene (32 mg, 0.2 mmol), the iodine compound (94.8 mg, 0.3 mmol), triethyl phosphite (199.2 mg, 1.2 mmol) were dissolved in 1 mL of N, N-dimethylformamide in a reaction flask. The reaction mixture was stirred at 80° C.;
(2) The reaction was tracked to completion by TLC.
(3) After the reaction was complete, the reaction mixture containing a crude product was purified by column chromatography (petroleum ether:acetone=1:8) to obtain the title compound (a yield of 81%). The analytical data of the product: $^1$H NMR (400 MHz, CDCl$_3$): δ 8.07 (d, J=8.1 Hz, 2H), 7.35 (dd, J=8.3, 1.7 Hz, 2H), 6.80 (dq, J=22.9, 7.6 Hz, 1H), 4.17-4.03 (m, 4H), 3.94 (s, 3H), 1.29 (t, J=7.1 Hz, 6H); HRMS (ESI-TOF) m/z: (M+H): calculated value: 367.0922, measured value: 367.0935.

Example 10 Synthesis of (1-phenyl-2-trifluoromethyl)dimethylvinylphosphonate

Taking phenylacetylene as starting material, the reaction steps were as follow:
(1) Phenylacetylene (20.4 mg, 0.2 mmol), the iodine compound (94.8 mg, 0.3 mmol), triethyl phosphite (99.4 mg, 0.6 mmol) were dissolved in 1 mL of acetone in a reaction flask. The reaction mixture was stirred at 50° C.;
(2) The reaction was tracked to completion by TLC.
(3) After the reaction was complete, the reaction mixture containing a crude product was purified by column chromatography (petroleum ether:acetone=1:8) to obtain the title compound (a yield of 81%). The analytical data of the product: $^1$H NMR (400 MHz, CDCl$_3$): δ 7.43-7.33 (m, 3H), 7.26 (dd, J=7.8, 4.3 Hz, 2H), 6.79 (dq, J=23.0, 7.6 Hz, 1H), 3.74 (d, J=11.1 Hz, 6H); HRMS (ESI-TOF) m/z: (M+Na): calculated value: 303.0374, measured value: 303.0381.

Example 11 Synthesis of (1-phenyl-2-trifluoromethyl)vinylphosphonic acid dibutyl ester Taking phenylacetylene as starting material, the reaction steps were as follow:

(1) Phenylacetylene (20.4 mg, 0.2 mmol), the iodine compound (94.8 mg, 0.3 mmol), tri-n-butyl phosphite (300 mg, 1.2 mmol) were dissolved in 1 mL of acetone in a reaction flask. The reaction mixture was stirred at 30° C.;

(2) The reaction was tracked to completion by TLC.

(3) After the reaction was complete, the reaction mixture containing a crude product was purified by column chromatography (petroleum ether:acetone=1:8) to obtain the title compound (a yield of 71%). The analytical data of the product: $^1$H NMR (400 MHz, CDCl$_3$): δ 7.45-7.33 (m, 3H), 7.31-7.19 (m, 2H), 6.76 (dq, J=23.0, 7.7 Hz, 1H), 4.11-3.91 (m, 4H), 1.66-1.51 (m, 4H), 1.40-1.24 (m, 4H), 0.88 (t, J=7.4 Hz, 6H); HRMS (ESI-TOF) m/z: (M+H): calculated value: 365.1493, measured value: 365.1505.

Example 12 Synthesis of (1-cyano-2,2-bis(trifluoromethyl)vinylphosphonic acid diethyl ester Taking 1-trifluoromethyl-2-cyanoacetylene as starting material, the reaction steps were as follow:

(1) 1-Trifluoromethyl-2-cyanoacetylene (23.6 mg, 0.2 mmol), the iodine compound (94.8 mg, 0.3 mmol), triethyl phosphite (99.4 mg, 0.6 mmol) were dissolved in 1 mL of N, N-dimethylformamide in a reaction flask. The reaction mixture was stirred at 60° C.;

(2) The reaction was tracked to completion by TLC.

(3) After the reaction was complete, the reaction mixture containing a crude product was purified by column chromatography (petroleum ether:acetone=1:8) to obtain the title compound (a yield of 77%). The analytical data of the product: $^1$H NMR (400 MHz, CDCl$_3$): δ 4.54-4.30 (m, 4H), 1.22 (t, J=7.4 Hz, 6H); HRMS (ESI-TOF) m/z: (M+H): calculated value: 326.0381, measured value: 326.0392.

Example 13 Synthesis of (1-(thiophen-2-yl)-2-trifluoromethyl)vinylphosphonic acid diethyl ester Taking 2-ethynylthiophene as starting material, the reaction steps were as follow:

(1) 2-Ethynylthiophene (21.6 mg, 0.2 mmol), the iodine compound (94.8 mg, 0.3 mmol), triethyl phosphite (99.4 mg, 0.6 mmol) were dissolved in 1 mL of N, N-dimethylformamide in a reaction flask. The reaction mixture was stirred at room temperature;

(2) The reaction was tracked to completion by TLC.

(3) After the reaction was complete, the reaction mixture containing a crude product was purified by column chromatography (petroleum ether:acetone=1:8) to obtain the title compound (a yield of 84%). The analytical data of the product: $^1$H NMR (400 MHz, CDCl$_3$): δ 7.50-7.40 (m, 1H), 7.19 (t, J=2.5 Hz, 1H), 7.06 (dd, J=6.5, 2.2 Hz, 1H), 6.79 (dq, J=22.3, 7.9 Hz, 1H), 4.18-4.07 (m, 4H), 1.30 (t, J=7.1 Hz, 6H); HRMS (ESI-TOF) m/z: (M+Na): calculated value: 337.0251, measured value: 337.0263.

Example 14 Synthesis of (1-(2-bromophenyl)-2-trifluoromethyl)vinylphosphonic acid diethyl ester Taking 2-bromophenylacetylene as starting material, the reaction steps were as follow:

(1) 2-Bromophenylacetylene (36 mg, 0.2 mmol), the iodine compound (94.8 mg, 0.3 mmol), triethyl phosphite (199.2 mg, 1.2 mmol) were dissolved in 1 mL of N, N-dimethylformamide in a reaction flask. The reaction mixture was stirred at 40° C.;

(2) The reaction was tracked to completion by TLC.

(3) After the reaction was complete, the reaction mixture containing a crude product was purified by column chromatography (petroleum ether:acetone=1:8) to obtain the title compound (a yield of 93%). The analytical data of the product: $^1$H NMR (400 MHz, CDCl$_3$): δ 7.48-7.43 (m, 1H), 7.36-7.29 (m, 2H), 7.25-7.20 (m, 1H), 6.88 (dq, J=22.6, 7.5 Hz, 1H), 4.23-4.08 (m, 4H), 1.33 (t, J=10.6, 7.0, 0.4 Hz, 6H); HRMS (ESI-TOF) m/z: (M+H): calculated value: 386.9973, measured value: 386.9984.

Example 15 Synthesis of (1-(3-fluorophenyl)-2-trifluoromethyl)vinylphosphonic acid diethyl ester Taking 3-fluorophenylacetylene as starting material, the reaction steps were as follow:

(1) 3-fluorophenylacetylene (24 mg, 0.2 mmol), the iodine compound (94.8 mg, 0.3 mmol), triethyl phosphite (199.2 mg, 1.2 mmol) were dissolved in 1 mL of N, N-dimethylformamide in a reaction flask. The reaction mixture was stirred at room temperature;

(2) The reaction was tracked to completion by TLC.

(3) After the reaction was complete, the reaction mixture containing a crude product was purified by column chromatography (petroleum ether:acetone=1:8) to obtain the title compound (a yield of 8%). The analytical data of the product: $^1$H NMR (400 MHz, CDCl$_3$): δ 7.34-7.19 (m, 2H), 7.05 (dd, J=15.4, 7.0 Hz, 2H), 6.74 (dq, J=22.8, 7.6 Hz, 1H), 4.22-4.01 (m, 4H), 1.27 (t, J=12.3, 6.0 Hz, 6H); HRMS (ESI-TOF) m/z: (M+Na): calculated value: 349.0593, measured value: 349.0586.

The invention claimed is:

1. A method for preparing a trifluoromethyl alkenylphosphonate derivative comprising:

reacting an acetylene derivative, an iodine compound, and a phosphorus reagent in a solvent at room temperature to obtain the trifluoromethyl alkenylphosphonate derivative, wherein:

the acetylene derivative has the following structure:

the iodine compound has the following structure:

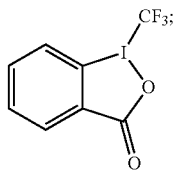 [SMILES: O=C1OI(C(F)(F)F)c2ccccc21]

the phosphorus reagent has the following structure:

the trifluoromethyl alkenylphosphonate derivative has the following structure:

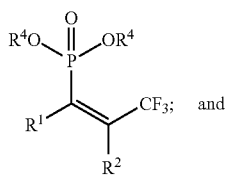

R¹ is aryl, cyano, or ester; R² is hydrogen, cyano or ester; and R⁴ is methyl, ethyl, isopropyl or butyl.

2. The method according to claim 1, wherein the solvent is the group consisting of acetone, ethyl acetate, toluene, and N, N-dimethylformamide.

3. The method according to claim 1, wherein the acetylene derivative is selected from the group consisting of phenylacetylene, 4-methylphenylacetylene, 4-methoxyphenylacetylene, 4-fluorophenylacetylene, 4-chlorophenyl-acetylene, 4-bromophenylacetylene, 4-nitrophenylacetylene, 4-methoxycarbonylphenylacetylene, 4-cyanophenylacetylene, 1-trifluoromethyl-2-cyanoacetylene, 2-ethynylthiophene, 2-bromophenyl-acetylene, and 3-fluorophenylacetylene; the phosphorus reagent is selected from the group consisting of trimethyl phosphite, triethyl phosphite, and tri-n-butyl phosphate.

4. The method according to claim 1, further comprising: tracking reaction to completion by a thin layer chromatography.

5. The method according to claim 1, wherein a molar ratio of the acetylene derivative:the iodine compound:the phosphorus reagent is 1:1.5:(3 to 7).

6. The method according to claim 1, wherein the reaction of the acetylene derivative, the iodine compound, and the phosphorus reagent is conducted in the solvent without a catalyst.

* * * * *